United States Patent
Koerwien et al.

(10) Patent No.: US 10,328,682 B2
(45) Date of Patent: Jun. 25, 2019

(54) SENSOR INTEGRATION IN THE JOINING OF STRUCTURAL ELEMENTS

(71) Applicant: AIRBUS DEFENCE AND SPACE GMBH, Taufkirchen (DE)

(72) Inventors: Thomas Koerwien, Taufkirchen (DE); Alois Friedberger, Taufkirchen (DE); Andreas Helwig, Taufkirchen (DE); Uwe Beier, Taufkirchen (DE); Frank Weiland, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 15/607,019

(22) Filed: May 26, 2017

(65) Prior Publication Data

US 2017/0355182 A1 Dec. 14, 2017

(30) Foreign Application Priority Data

Jun. 13, 2016 (EP) .................................... 16174253

(51) Int. Cl.
*B32B 41/00* (2006.01)
*B32B 5/26* (2006.01)
(Continued)

(52) U.S. Cl.
CPC .............. *B32B 41/00* (2013.01); *B29C 70/00* (2013.01); *B29C 70/443* (2013.01); *B29C 70/54* (2013.01);
(Continued)

(58) Field of Classification Search
CPC ....... B32B 41/00; B32B 27/08; B32B 37/182; B32B 37/10; B32B 5/26; B32B 2260/046; B32B 2262/106; B32B 27/285
(Continued)

(56) References Cited

U.S. PATENT DOCUMENTS 6,127,822 A 10/2000 Sasahara et al.
2006/0272429 A1* 12/2006 Ganapathi ............... G01L 1/142
73/862.046

(Continued)

FOREIGN PATENT DOCUMENTS

DE 10 2009 019774 A1 11/2010
WO WO 2006/058880 A1 6/2006

OTHER PUBLICATIONS

German Search Report for Application No. 16174253 dated Jul. 20, 2016.
(Continued)

*Primary Examiner* — Michael N Orlando
*Assistant Examiner* — Joshel Rivera
(74) *Attorney, Agent, or Firm* — Jenkins, Wilson, Taylor & Hunt, P.A.

(57) ABSTRACT

A method for joining structural elements to a component made of at least one fiber-reinforced plastics material, includes providing at least two structural elements made of at least one fiber-reinforced plastics material having a particular matrix; providing at least one film element made of a thermoplastic heavy-duty material; arranging the at least one film element on a surface of one of the structural elements or between surfaces to be joined of the at least two structural elements to be joined; and producing the component to be joined in a curing process.

18 Claims, 1 Drawing Sheet

(51) Int. Cl.
*B32B 27/08* (2006.01)
*B32B 37/10* (2006.01)
*B32B 37/18* (2006.01)
*B29C 70/44* (2006.01)
*B29C 70/54* (2006.01)
*B29C 70/00* (2006.01)
B32B 27/28 (2006.01)
B29C 65/48 (2006.01)
B29C 65/50 (2006.01)
B29C 65/00 (2006.01)
B29C 65/02 (2006.01)
B64D 45/00 (2006.01)
B64C 1/00 (2006.01)
B64C 27/473 (2006.01)

(52) U.S. Cl.
CPC .............. *B32B 5/26* (2013.01); *B32B 27/08* (2013.01); *B32B 37/10* (2013.01); *B32B 37/182* (2013.01); *B29C 65/02* (2013.01); *B29C 65/4815* (2013.01); *B29C 65/5057* (2013.01); *B29C 66/721* (2013.01); *B29C 66/7212* (2013.01); *B29C 66/73751* (2013.01); *B29C 66/73752* (2013.01); *B29C 66/73754* (2013.01); *B29C 66/73755* (2013.01); *B32B 27/285* (2013.01); *B32B 2260/046* (2013.01); *B32B 2262/106* (2013.01); *B64C 2001/0072* (2013.01); *B64C 2027/4736* (2013.01); *B64D 2045/0085* (2013.01); *Y02T 50/43* (2013.01)

(58) Field of Classification Search
USPC .......................... 156/64, 350, 351, 378, 379
See application file for complete search history.

(56) References Cited

U.S. PATENT DOCUMENTS

| | | |
|---|---|---|
| 2008/0289426 A1 | 11/2008 | Kearns et al. |
| 2013/0147636 A1 | 6/2013 | Georgeson et al. |
| 2016/0077027 A1 | 3/2016 | Sweers et al. |

OTHER PUBLICATIONS

Mecham, "Under the Skin," Aviation Week & Space Technology, McGraw-Hill Company, New York, NY, US, vol. 166, Iss.15, pp. 79-80, XP001540137, ISSN: 0005-2175, Apr. 16, 2007.
Zhuang, "Design of Smart Adhesive Films for Bondline Integrity Monitoring," XP055025731, URL:http://structure.stanford.edu/documents\projects\zhuang.pdf, pp. 1 -8, Feb. 8, 2012.

\* cited by examiner

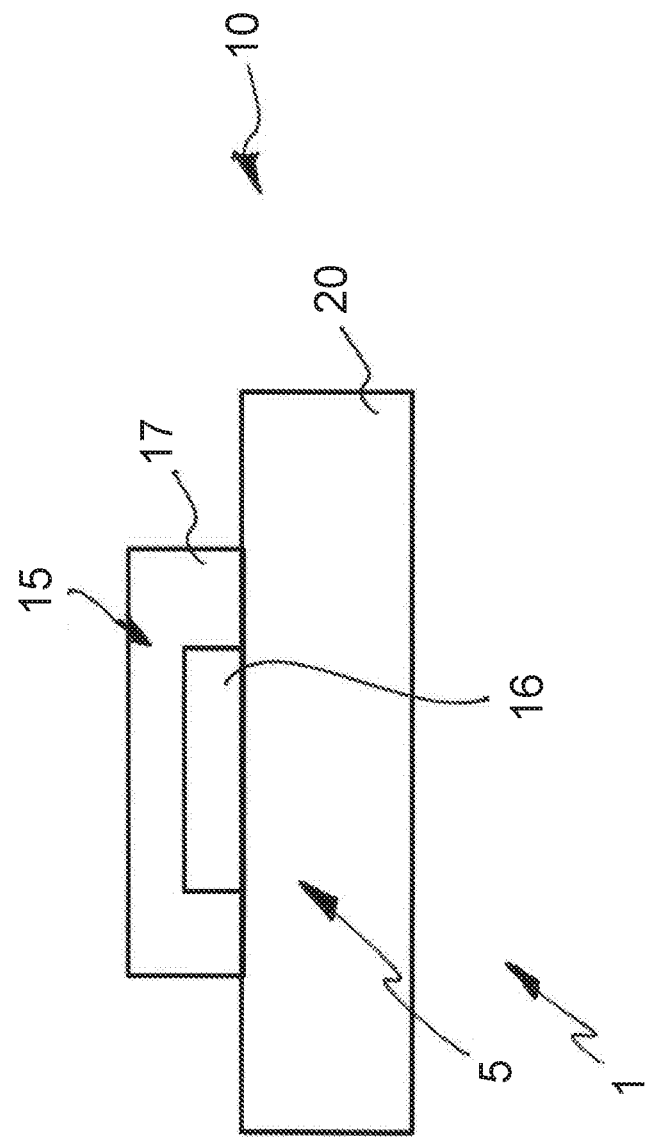

SENSOR INTEGRATION IN THE JOINING OF STRUCTURAL ELEMENTS

CROSS-REFERENCE TO RELATED APPLICATION

This application claims priority to European Patent Application EP 16 174 253.1 filed Jun. 13, 2016, the entire disclosure of which is incorporated by reference herein.

TECHNICAL FIELD

The disclosure herein relates to a method for joining structural elements made of at least one fiber-reinforced plastics material.

BACKGROUND

Methods of this kind are used in various components composed of structural elements, in particular in the aerospace engineering sector, in which methods considerations regarding the relationship between cost and weight play the most important role. In this regard, considerations that need to be included may, in view of the (increasing) complexity of structural elements, but also the number thereof, relate to process risks that could be reduced or avoided. Considerations regarding weight savings over substantially comparable methods, the integrity of the fiber structure or matrix of the structural elements produced in two different ways, and the case in which a plurality of parts that are to be produced differently may have to be combined also play a part.

The structural elements, which are to be processed, to be joined to a component and are made of a fiber-reinforced plastics material, are generally fiber-matrix semi-finished products that have to be cured under application of pressure and temperature in order to produce the component. These semi-finished products, which are often held as track-like preforms, but are not fixed in this shape, are also referred to as "prepregs" (short for "preimpregnated fibers") and in most cases consist of a thermosetting matrix that is filled with fibers but is not cured. In this case, the matrix in question is therefore in a partially cross-linked state and cannot be liquefied again by being heated.

The mentioned semi-finished products can therefore be joined in methods of varying complexity, some of which are associated with being considerably complex. Furthermore, the structural elements to be joined can be provided with additional holding means, such as rivets, or also with reinforcing means.

SUMMARY

One idea of the disclosure herein providing a method that yields a durable and hard-wearing joined component in a cost-effective manner and whilst keeping complexity and weight to a minimum.

Accordingly, one idea is in particular that of using a method in which at least the following method steps are performed:
  providing at least two structural elements made of at least one fiber-reinforced plastics material having a particular matrix;
  providing at least one sensor film element made of a thermoplastic material;
  arranging the at least one sensor film element on a surface of one of the structural elements or between surfaces to be joined of the at least two structural elements to be joined;
  producing the component to be joined in a curing process.

The disclosure herein therefore includes firstly providing a film element, which has sensor properties and is made of a thermoplastic material, on one or between the two semi-finished products of the structural elements after these have been provided. In the subsequent curing process of the matrix of the structural elements, which takes place under heat, the sensor film element is initially solubilised. The sensor film element then cross-links again and is thus connected to the matrix of the structural elements. The structural elements are often those having a CFRP matrix (carbon-fiber-reinforced matrix) that are processed at temperatures in the order of 180° C. Thermoplastic of the sensor film element can be selected so as to match the matrix and the temperature, which has to be below the decomposition temperature of thermoplastic.

The joining process between the structural elements that takes place by the at least one sensor film element is a kind of film diffusion welding process, in which an amorphous thermoplastic is advantageously formed as a robust intermediate phase between the resin systems of the structural elements. In principle, this may be achieved in a plurality of different processes, namely using, for example, structural elements which are also already (partially) cured and to which a film element is applied that forms the intermediate phase in a subsequent curing. By incorporating an already cured structural element provided with a film element into an injection method, the required finishing of the end product of the method and the complexity of substructures that are to be produced can also be reduced. Similar advantages also arise if an already cured structural element provided with a film element is cured together with a structural element that is not yet cured.

In an expedient variant of the method according to the disclosure herein, the desired intermediate phase that interconnects the structural elements is suitably formed by a sensor film element that is formed from a polyimide or a polysulfone.

Particularly preferably, the sensor film element is designed as a sensor holder made of polyetherimide or polyethersulfone. Using the mentioned materials, comparatively light-weight joining connections can be produced between the structural elements at reasonable cost; the materials are non-toxic and form a durable intermediate phase with the resins of the structural elements. The glass transition temperature is higher than the working temperature when forming the intermediate phase; the sensor film elements are stable dimensionally and with respect to thickness, have suitable thermal expansion properties, do not require pre-treatment, are resistant to a range of aggressive substances such as solvents or fuels, and are scratch-proof and wear-resistant, and therefore overall a favorable component that can be easily controlled can be achieved in the joining process.

In order to obtain additional information on, for instance, certain ambient conditions by the at least one film element when it is being used, the method according to the disclosure herein may, in an advantageous variant, provide for designing the sensor film element, before being provided, as a sensor holder that is provided with at least one sensor or a plurality of sensors. By the sensors in question, variables describing the state of the joining process, for instance, can be obtained or monitored. A plurality of sensor film elements may also each be provided with one or more sensors.

In advantageous developments, it may be provided that, in variants of the method according to the disclosure herein, the arrangement of the at least one sensor film element on a surface of one of the structural elements or between surfaces to be joined of the at least two structural elements to be joined is monitored by the sensors of the sensor holder.

In order to monitor the continuing integrity of the joined component or its changing surroundings and to take measures where necessary, even after the component has been produced, a further advantageous variant may provide that, when the joined structural element is in operation, the sensor holder is used to monitor the state of the component and/or to detect damage. In this case, for instance within the meaning of "structural health monitoring" (SHM), it is possible to monitor structures of components having support properties and/or structures having a static mounting such as foils or hull surfaces of vessels and aircraft or even rotor blades. In this case, it can be advantageous that, provided that monitoring values which allow a state to be described in terms of the presence or imminent occurrence of damage are available at all times, it is possible to assess the influence of the damage on the properties and durability of the particular structure and thus, for instance, to cut down on maintenance times.

For a state to be described in such a manner, it can be advantageous that, in a development of the method according to the disclosure herein, one or more parameters relevant to the particular process are recorded by the sensors. In this case, "process" can also refer to the "normal operation" of the component.

Preferably, the temperature, the pressure and/or the degree of curing of the structural elements and/or of the intermediate phase formed with the sensor film element are recorded as the parameters in this case.

If the sensor holder records the temperature as a parameter, in a variant of the method according to the disclosure herein, the sensor holder can be provided with at least one metal conductor track, in particular with a meandering metal conductor track, and therefore for example the surface of the film element can be evenly scanned and temperature values can be obtained by way of resistance measurements. Other arrangements of sensors are, however, also conceivable. Another advantageous variant, which constitutes an alternative measuring method, expediently provides that the sensor holder is provided with metal conductor tracks made of at least two metal materials in order to record the temperature as a parameter, such that the tracks form a thermal element in principle.

In order to obtain information on the load of structural elements or components after they have been produced, in another embodiment at least one of the sensors or a subgroup of sensors may be designed as a combination of a sensor and an actuator. Preferably, in this case the at least one sensor or the sensors may be designed as a ultrasonic transducer, for example as a piezoelectric element. Thereby, a spot-wise retrieval of values may be used, but the use of a Lamb wave technique (mixed pressure waves and shear waves) for detecting damage online is also conceivable. Using Lamb waves, larger regions of components can be inspected, without the need for scanning as in the above-mentioned spot-wise ultrasonic inspection. The Lamb waves brought about when damage occurs, which is referred to as impact, or when damage grows can be picked up by piezoelectric sensors and accordingly analysed. Furthermore, Lamb waves can however also be emitted, received and analysed in a defined manner by a network of distributed actuators and sensors.

Finally, expedient variants of the method for joining components according to the disclosure herein consist in or comprise the curing process of the method being performed in a hot isostatic or unidirectional manner, there not being a predominant direction of pressure application in the hot isostatic process.

The above embodiments and developments can, where expedient, be combined as desired. Further possible embodiments, developments and implementations of the disclosure herein also include not explicitly stated combinations of features of the disclosure herein described above or in the following with reference to the embodiments. In particular, a person skilled in the art will also add individual aspects to the particular basic design of the present disclosure as improvements or additions.

BRIEF DESCRIPTION OF THE DRAWINGS

The disclosure herein will be described in greater detail in the following with reference to embodiments in the drawings, in which the FIGURE is a partially schematic, flat cross-sectional side view of an embodiment of a sensor arrangement having a sensor holder, sensor structure and passivation for arrangement, for example, between plastics layers of a structural element.

DETAILED DESCRIPTION

The single FIGURE, FIG. 1, shows a sensor arrangement, denoted overall as 10, that is provided to record process parameters in situ on or within structural elements 1 (not shown in detail), for which conductor tracks 16 are applied to a film element 5, which is designed as a sensor holder 20, as sensor structures 15 or parts thereof. In order to take temperature measurements, i.e. in order to determine temperatures as state variables, sensor structures 15 can be used in this case as a resistance thermometer. Thermometer is laminated between the fiber-reinforced plastics layers (CFRP layers) (not shown in greater detail) of the structural element 1 and is intended, for example, to allow for local temperature analysis during the infiltration process and curing process.

By way of example, the width of the conductor track 16 that is shown, as a measurement line or power supply line, is 30 μm. In order to precisely determine the current temperature, two power supply lines and two measurement lines may be advantageous in this case. A thermoplastic film made of polyetherimide (PEI) was used as the substrate material of the sensor holder 20.

In the first manufacturing step, feed lines and contact pads (not shown) are printed using an inkjet method, for example. The sensor structure 15 is then applied using an aerosol jet method, for instance. As a final manufacturing step, an insulating layer 17 is applied over the conductor tracks 16 of the sensor structure 15, which layer shields the sensor structure 15 from the conductive surroundings. The screen printing technique, for example, is used to apply the insulating layer 17, which is substantially on the side of the sensor structure 15 that is remote from the sensor holder 20, as can be seen from FIG. 1. A passivation of this kind can, for example, be reapplied as a layer made of PEI, but also as a polyimide layer or as a solder resist. After each screen printing process, the applied passivation layer 17 can be cured.

The sensor structures 15 applied to the sensor holders 20 are inserted between the CFRP layers (not shown) of a structural element 1, which is then infiltrated and cured in an autoclave in order to establish the integral joining connection between the sensor holder 20 and the structural element 1.

The disclosure herein described above thus relates to a method for joining structural elements 1 to a component made of at least one fiber-reinforced plastics material, comprising the following method steps: providing at least two structural elements 1 made of at least one fiber-reinforced plastics material having a particular matrix; providing at least one sensor film element 5 made of a thermoplastic material; arranging the at least one sensor film element 5 on a surface of one of the structural elements 1 or between surfaces to be joined of the at least two structural elements 1 to be joined; and producing the component to be joined in a curing process. When the structural element 1 is produced, the sensor film element 5 forms an integral joining connection to the matrix of the structural element.

Although the present disclosure has been described above with reference to a preferred embodiment, the disclosure herein is not limited thereto but may rather be modified in many different ways. In particular, the disclosure herein may be altered or modified in various ways, without deviating from the basic concept of the disclosure herein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for joining structural elements into a component made of at least one fiber-reinforced plastics material, the method comprising:
   providing at least two structural elements made of at least one fiber-reinforced plastics material having a particular matrix;
   providing at least one sensor film element made of a thermoplastic material;
   arranging the at least one sensor film element on a surface of one of the structural elements or between surfaces to be joined of the at least two structural elements to be joined; and
   producing the component in a curing process, wherein the at least one sensor film element is fused with the structural elements arranged on each side thereof such that the at least one sensor film element is integral to the component produced.

2. The method of claim 1, wherein, when the component is produced, a durable intermediate phase is formed on the surfaces of the structural elements to be joined by the sensor film element having the matrix of one of the at least two structural elements.

3. The method of claim 1, wherein the sensor film element comprises a polyimide or a polysulfone.

4. The method of claim 3, wherein the sensor film element forms a sensor holder made of polyetherimide or polyethersulfone.

5. The method of claim 1, wherein, before being provided, the at least one sensor film element is designed as a sensor holder with at least one sensor or a plurality of sensors.

6. The method of claim 5, comprising monitoring, by the at least one sensor or a plurality of sensors of the sensor holder, at least one of arranging the at least one sensor film element on a surface of one of the structural elements or between surfaces to be joined of the at least two structural elements.

7. The method of claim 5, wherein one or more parameters of the process are recorded by the at least one sensor or a plurality of sensors.

8. The method of claim 7, wherein the one or more parameters comprise one or more of temperature, pressure, and degree of curing.

9. The method of claim 8, wherein the sensor holder comprises at least one metal conductor track to record the temperature.

10. The method of claim 9, wherein the at least one metal conductor track comprises a meandering metal conductor track.

11. The method of claim 8, wherein the sensor holder comprises metal conductor tracks made of at least two metal materials to record the temperature.

12. The method of claim 5, wherein at least one, or a subgroup of, the at least one sensor or a plurality of sensors is designed as a sensor/actuator combination.

13. The method of claim 5, wherein at least one of the at least one sensor or the plurality of sensors is an ultrasonic transducer.

14. The method of claim 13, wherein the ultrasonic transducer is designed as a piezoelectric element.

15. The method of claim 5, wherein producing the component in a curing process is performed in a hot isostatic or unidirectional manner.

16. The method of claim 1, comprising monitoring the arranging of the at least one sensor film element on a surface of one of the structural elements.

17. The method of claim 1, comprising monitoring joining of two structural elements, between which the sensor film element is arranged.

18. The method of claim 4, wherein, when in operation, the sensor holder monitors a state of the component and detects damage.

* * * * *